United States Patent [19]

Duveau

[11] 4,352,298

[45] Oct. 5, 1982

[54] APPARATUS FOR THE ACCUMULATION AND RELEASE OF ENERGY

[75] Inventor: François Duveau, Courbevoie, France

[73] Assignee: Pompes Essa Mico, Carriere sur Seine, France

[21] Appl. No.: 139,559

[22] Filed: Apr. 11, 1980

[30] Foreign Application Priority Data

Apr. 13, 1979 [FR] France .................... 79 09404

[51] Int. Cl.³ .............. F16H 27/04; F16H 33/02
[52] U.S. Cl. .................................. 74/84 R; 74/97
[58] Field of Search ............ 74/84, 97, 100 R, 100 P; 64/2 R; 185/39, 40 R, 37, DIG. 1; 200/63 R, 67 C, 70, 329, 337; 15/104.3 SN

[56] References Cited

U.S. PATENT DOCUMENTS 3,190,983 6/1965 Kesl .................. 200/67 C

FOREIGN PATENT DOCUMENTS 1064250 12/1953 France .................... 15/104.3 SN
674316 11/1964 Italy .................... 200/67 C

OTHER PUBLICATIONS

Noy, "8 Snap Action Devices," *Mechanisms, Linkages and Mechanical Controls*, McGraw-Hill Co., Feb. 1966, pp. 160–161.

*Primary Examiner*—Lawrence J. Staab

[57] ABSTRACT

Input torque, at a comparatively low energy level and preferably delivered constantly, is converted to comparatively high energy output torque pulses by storing the applied torque in a leaf spring which, in its unstressed state, is elastically deformed. Energy is accumulated in the spring by twisting it about its longitudinal axis through rotating a first end thereof. Stored energy is released by periodically allowing the second end of the spring to rotate.

5 Claims, 4 Drawing Figures

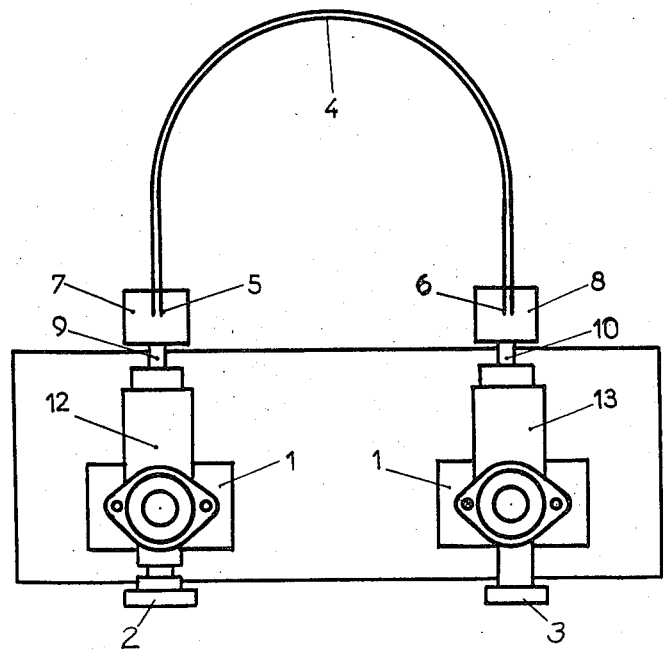
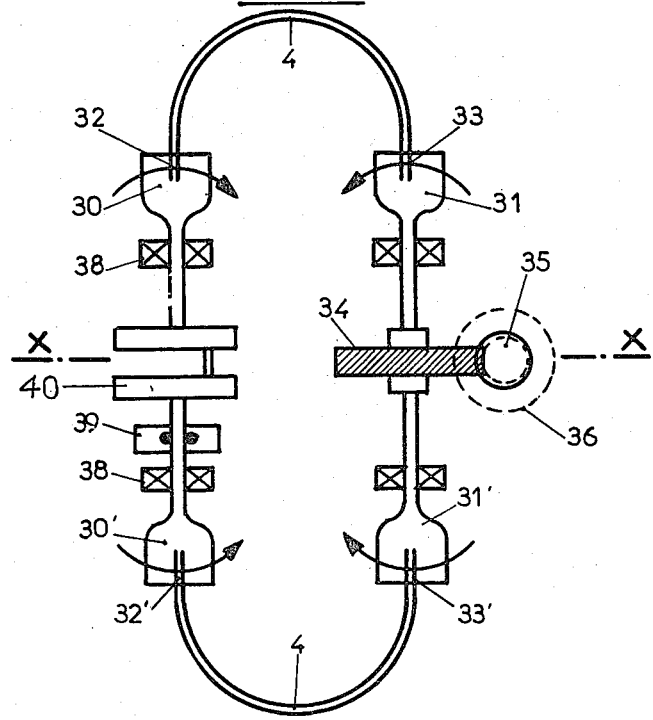

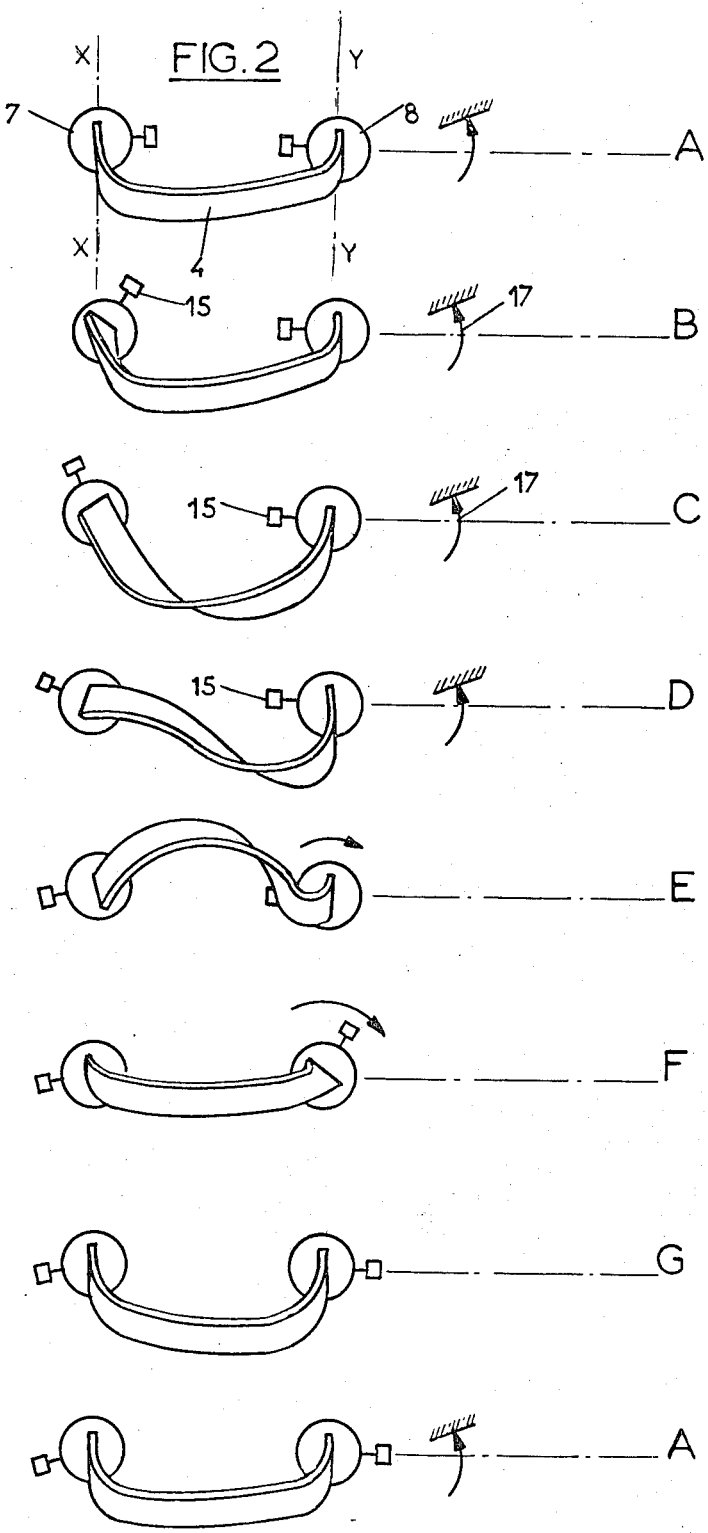

APPARATUS FOR THE ACCUMULATION AND RELEASE OF ENERGY

BACKGROUND OF THE INVENTION (1) Field of the Invention

The present invention relates to the generation of torque and particularly to the conversion of a constant low torque input to a periodic high torque output. More specifically, this invention is directed to apparatus for accumulating torque delivered thereto at a comparatively low energy level and to periodically releasing the stored energy in the form of comparatively high energy content impulses. Accordingly, the general objects of the present invention are to provide novel and improved methods and apparatus of such character.

(2) Description of the Prior Art

The use of springs to store energy for subsequent and progressive release is well known in the art; particularly in the art of time keeping. In the typical time piece, springs in spiral form are used to store energy. So-called helicoidal springs are also known in the art. With both spiral and helicoidal springs, the leaf of the spring is given a prior deformation such that the spring, in its unwound state, has the form of a spiral or helix.

SUMMARY OF THE INVENTION

The present invention relates to a unique method of employing a spring for the storage of energy which which is periodically released for the purpose of performing useful work. In accordance with the present invention, by way of contra distinction to the prior art, the spring remains in the province of elastic deformation.

Apparatus in accordance with the present invention employs at least a first leaf spring which is curved, about an arc of 180°, to form a half-loop with the opposite ends of the spring facing each other in the unstressed state. The two ends of the spring; i.e., the opposite ends of the arc or half-loop; are supported for rotation about parallel axes. A first end of the spring will function as the drive or input end while the second end of the spring will function as the driven or output end. If one considers an initial condition wherein a line along the midpoint of the spring lies in a vertical plane, with the peak or highest point of the loop finding an imaginary horizontal generatrix which serves only to indicate the deformation which will be imparted to the spring, rotation of one end of the spring while restraining the other end against rotation will cause the half-loop or arc to progressively change its form. During this change in form the horizontal generatrix changes position as a consequence of the torsion which the spring undergoes. Specifically, the horizontal generatrix moves toward the driven end of the spring and, when it approaches a position vertically displaced from the driven end, the driven end of the spring will suddenly and with extreme force rotate about its axis. During this rotation of the driven end of the spring, the horizontal generatrix will return to its initial position and the spring will resume its original position and form. The spring will, however, now be inverted when compared to its initial condition.

Through the use of appropriate input and output mechanisms, the present invention controls the rotation of the input end of the spring and the derivation of useful torque from the periodic movements of the output or driven end of the spring.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 1 is a schematic plan view of apparatus for use in testing the present invention;

FIG. 2 is a schematic perspective view which represents, in step-wise fashion, operation of the present invention;

FIG. 3 is a schematic illustration of an embodiment of the present invention employing a pair of springs.

DESCRIPTION OF THE PREFERRED EMBODIMENT

Figure 4:
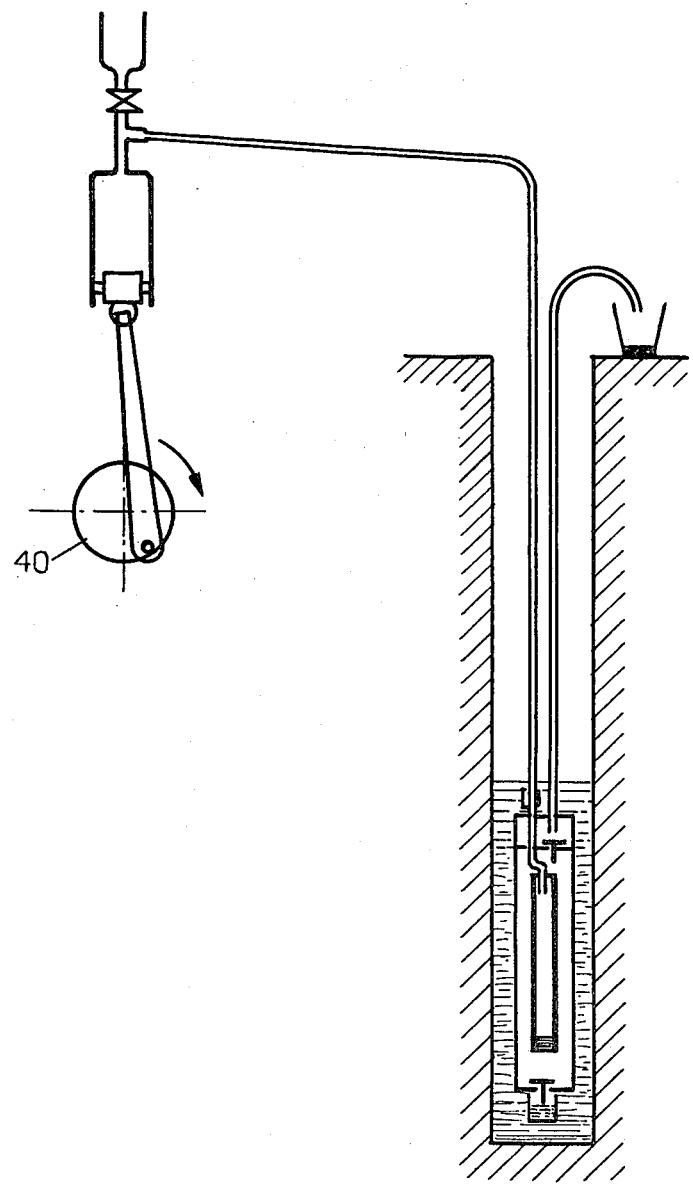
FIG. 4 is a schematic illustration of a pumping system with which the present invention may be employed.

Referring to FIG. 1, test apparatus employed to prove the operability and utility of the present invention is shown schematically. In the apparatus depicted in FIG. 1, a leaf spring is indicated at 4. Spring 4 is bent about an arc of 180° to form a half-loop and the opposite ends 5 and 6 thereof are anchored, by any appropriate means, in respective support blocks or cylinders 7 and 8. The support blocks 7 and 8 are respectively mounted for rotation on first ends of axles 9 and 10. The axes X—X and Y—Y respectively (see FIG. 2A) of axles 9 and 10 are parallel.

For purposes of explanation, the axle 9 may be considered the drive or input axle while axle 10 may be considered the driven or output axle. The second ends of axles 9 and 10 are respectively coupled to gear trains which are positioned within gear cases 12 and 13. The gear cases 12 and 13 are supported above a base plate by means of feet 1. In the manner to be described below in the discussion of FIG. 2, the delivery of torque to the drive end 5 of spring 4, by imparting rotation to axle 9 by means of turning an input member 2, will cause the periodic rotation of axle 10 and a usable output torque can be obtained by coupling to output member 3.

Referring to FIG. 2, wherein the spring 4 is shown in perspective, eight successive orientations of the spring and the mounting blocks 7 and 8 during the rotation of drive end 5 of spring 4 and block 7 through 360° are depicted. It is to be noted that no effort has been made, in preparing FIG. 2, to divide the rotation of the drive end of spring 4 into steps of equal magnitude. In steps A-D, as indicated by arrow 17, the drive end 5 of spring 4 is indicated as being rotated in the counterclockwise direction by means of imparting rotation to mounting block 7 via axle 9. During this movement of the first end of spring 4, the driven or governed mounting block 8 is restrained against rotation as may be seen from the timing indicia 15. The means which prevents rotation of the driven or governed mounting block 8 is indicated schematically at 17. Accordingly, as block 7 is rotated from the position of step A to that of step D, and the spring is being distorted as shown, energy is being stored in spring 4.

The energy stored in spring 4 reaches its maximum at approximately the degree of rotation of the drive end thereof depicted at step D. If the restraint is removed from mounting block 8 when the block 7 has been rotated just past the position of step D, the driven end 6 of spring 4 will "snap" about an arc of approximately 180° as shown in steps E, F and G. By comparing the positions of the rotatable mounting blocks 7 and 8 in steps E, F and G, it may be seen that the sudden output torque represented by the rotation of the driven end 6 of spring 4 occurs at a high rate of speed; i.e., during the time that the constantly rotating drive end 5 of the spring has undergone virtually no movement. When the driven end 6 of spring 4 reaches the position of step G, the mounting block 8 may again be braked, as indicated at step A at the bottom of FIG. 2, while the rotation of mounting block 7 may be continued so that the cycle is repetitive.

As will be obvious to those skilled in the art, the torque recovered during the rapid inversion of the second or driven end of the spring will, in the FIG. 1 arrangement, have a periodic wave form with constant speed rotation of the drive end of the spring. This periodic torque may be converted into a substantially constant output by means of coupling a fly wheel or equivalent device between the driven end of the spring and the load.

Referring to FIG. 3, an energy system employing a pair of springs 4 is indicated schematically. In the FIG. 4 arrangement the drive or input ends of a pair of springs 4 are respectively indicated at 33 and 33'. Spring ends 33 and 33' are respectively captured in rotatable cylinders 31 and 31'. The drive shafts or axles extending from cylinders 31 and 31' are coupled to a crank 34 which is indicated schematically as being locked to and thus driven by a gear 35. Gear 35, in turn, may be driven by a gear 36 or other suitable means for delivering torque to gear 35. The ends 33 and 33' of springs 4 are thus driven simultaneously and the two springs may either be in phase or out of phase.

The driven or output ends 32 and 32' respectively of the two springs are attached to respective cylinders 30 and 30'. The rotatable axles or output shafts of cylinders 30 and 30' are supported in bearings 38. The ends of these axles are affixed to an output member 40 which will be restrained from rotation by a brake mechanism, indicated schematically at 39, which will prevent the cylinders 30 and 30' from rotating in the incorrect direction. In the disclosed embodiment the springs are in phase and thus a single brake mechanism 39 will suffice. Obviously, if the springs 4 are to be driven in an out-of-phase relationship, a clutch and a brake would have to be associated with each of cylinders 30 and 30'.

Referring to FIG. 4, the utility of the present invention, and particularly the apparatus depicted schematically in FIG. 3, is represented by showing the output crank 40 of FIG. 3 coupled to a pumping installation.

While both a preferred embodiment and apparatus for testing have been shown and described, substitutions and modifications may be made thereto without departing from the spirit and scope of the invention. Accordingly, it is to be understood that the present invention has been described by way of illustration and not limitation.

What is claimed is:

1. Apparatus for the accumulation and periodic release of mechanical energy comprising:
    a spring, said spring being in the form of an elongated metal band having a longitudinal axis, said spring having first and second ends, said spring being elastically deformed between said first and second ends without any twisting thereof about its longitudinal axis, said spring defining an open loop in the unstressed state;
    drive means, said drive means being affixed to said spring first end, said drive means being rotatable about a first axis to thereby impart a twisting moment to said spring about its axis; and
    driven means, said driven means being affixed to said second end of said spring, said driven means being rotatable in a first direction about a second axis to periodically relieve forces stored during twisting of said spring first end, said driven means including means for preventing rotation of said second end of said spring in a second direction opposite to said first direction, the axes of rotation of said drive and driven means being substantially parallel.

2. The apparatus of claim 1 wherein said rotation preventing means further prevents rotation of the spring second end in the first direction during an initial rotation of said spring first end.

3. Apparatus for the accumulation and periodic release of mechanical energy comprising:
    a first spring, said first spring being in the form of an elongated metal band having a longitudinal axis, said first spring having first and second ends;
    drive means, said drive means being affixed to said first end of said first spring, said drive means being rotatable to thereby impart a twisting moment to said first spring about its axis;
    driven means, said driven means being affixed to said second end of said first spring, said driven means being rotatable in a first direction to periodically relieve the forces stored during twisting of said first spring first end; and
    a second spring, said second spring also being in the form of an elongated metal band having a longitudinal axis, the first end of said second spring being affixed to said drive means for rotation by said drive means, the second end of said second spring being affixed to said driven means.

4. The apparatus of claim 3 wherein the axes of rotation of said drive and driven means are substantially parallel and said springs are elastically deformed in the unstressed state to define a pair of oppositely extending open loops.

5. The apparatus of claim 4 wherein said drive means simultaneously imparts rotational motion to the first ends of said springs and wherein said driven means prevents rotation of the second ends of said springs during an initial rotation of said spring first ends.

* * * * *